United States Patent
Sawada (10) Patent No.: US 8,919,876 B2
(45) Date of Patent: Dec. 30, 2014

(54) VEHICLE SEAT

(75) Inventor: Tamotsu Sawada, Isehara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 269 days.

(21) Appl. No.: 12/629,768

(22) Filed: Dec. 2, 2009

(65) Prior Publication Data

US 2010/0140986 A1 Jun. 10, 2010

(30) Foreign Application Priority Data

Dec. 4, 2008 (JP) ................. 2008-309191

(51) Int. Cl.
*B60N 2/427* (2006.01)
*B60N 2/42* (2006.01)

(52) U.S. Cl.
CPC .......... *B60N 2/4228* (2013.01); *B60N 2/42709* (2013.01)
USPC .................................. 297/216.1; 297/452.18

(58) Field of Classification Search
CPC ............. B60N 2/4221; B60N 2/42763; B60N 2/42709; B60N 2/4228
USPC ............... 297/216.1, 452.18, 284.11, 463.2, 297/423.1
See application file for complete search history.

(56) References Cited

U.S. PATENT DOCUMENTS

| | | | | |
|---|---|---|---|---|
| 4,673,215 A * | 6/1987 | Yokoyama | ............... | 297/452.18 |
| 6,450,573 B1 * | 9/2002 | Yamaguchi et al. | ........ | 297/216.1 |
| 6,648,409 B1 * | 11/2003 | Laporte | ...................... | 297/216.1 |
| 6,755,465 B2 * | 6/2004 | Yamaguchi et al. | ........ | 297/216.1 |
| 6,890,027 B2 * | 5/2005 | Marie et al. | ................ | 297/216.1 |
| 7,104,601 B2 * | 9/2006 | Masuda et al. | ............. | 297/216.1 |
| 7,156,457 B2 * | 1/2007 | Fujita et al. | ................ | 297/216.1 |
| 7,192,087 B2 * | 3/2007 | Adragna et al. | .......... | 297/284.11 |
| 7,533,932 B2 * | 5/2009 | Kawasaki et al. | .......... | 297/216.1 |
| 2001/0011810 A1 * | 8/2001 | Saiguchi et al. | ........... | 280/728.1 |

FOREIGN PATENT DOCUMENTS

| | | |
|---|---|---|
| GB | 2087226 A | 5/1982 |
| GB | 2347853 A | 9/2000 |
| JP | 2006-193040 | 7/2006 |
| JP | 2007-313907 A | 12/2007 |
| JP | 2008-292053 A | 12/2008 |
| WO | 2006075413 A1 | 7/2006 |

OTHER PUBLICATIONS

Office Action in CN Patent Application No. 200910253170.X, dated Jan. 29, 2012 (4 pages).
Extended European Search Report in EP Patent Application No. 09175808.6-2424, dated Feb. 24, 2010 (6 pages).
Office Action in EP Patent Application No. 09175808.6-2424, dated Jan. 20, 2011 (6 pages).
English Patent Abstract of JP2006-193040 from esp@cenet, Published Jul. 27, 2006.
Office Action in EP Patent Application No. 09175808.6-2424, dated Jul. 18, 2012 (5 pages).
Office Action issued in Japanese Application No. 2008-309191, mailed on May 21, 2013 (3 pages).

* cited by examiner

*Primary Examiner* — Milton Nelson, Jr.
(74) *Attorney, Agent, or Firm* — Osha Liang LLP

(57) ABSTRACT

A vehicle seat includes a seat cushion frame which comprises a pair of side frames and a front cross member located on a front side of the vehicle seat, the front cross member extending between the side frames and at least one leg support member is connected to the front cross member, and is arranged vehicle forward of the front cross member, wherein the at least one leg support member comprises at least a portion having a strength lower than a strength of the front cross member.

21 Claims, 7 Drawing Sheets

VEHICLE SEAT

CROSS-REFERENCE TO RELATED APPLICATIONS

The present application claims priority from Japanese Patent Application No. 2008-309191, filed Dec. 4, 2008. The contents of the priority application are hereby incorporated by reference in their entirety.

BACKGROUND OF THE DISCLOSURE

1. Field of the Disclosure

The present invention relates to a vehicle seat capable of reducing a load that is applied to an occupant seated in the vehicle seat during a vehicle collision.

2. Description of the Related Art

Japanese Patent Application Publication 2006-193040 discloses a seat cushion frame which is provided with side frames arranged in parallel on left and right sides, a front cross member extending between front end portions of the side frames, and a rear cross member extending between rear end portions of the side frames. The front cross member is formed by bending a substantially-rectangular flat metal material. During a head-on collision, a load resulting from a forward motion of an occupant causes only a central portion of an upper surface portion of the front cross member to deform downward into a buckled state. This is intended for absorbing an initial load applied to the occupant, and receiving the forward motion of the occupant with no significant shock applied to the occupant.

Conventional solutions are directed to reduce impact loads for head-on collisions rather than rear-end type collisions. Accordingly, when such rear-end collisions occur, a front side portion of the front cross member may impact the calves (or other portions of the legs) of the occupant, which may result in a large load to the legs and other parts of the occupant.

SUMMARY OF THE CLAIMED SUBJECT MATTER

In one aspect, the present disclosure relates to a vehicle seat comprising a seat cushion frame which further comprises a pair of side frames and a front cross member located on a front side of the vehicle seat. The front cross member extends between the side frames and at least one leg support member is connected to the front cross member, and is arranged vehicle forward of the front cross member, wherein the at least one leg support member comprises at least a portion having a strength lower than a strength of the front cross member.

In another aspect, the present disclosure relates to a vehicle seat comprising a seat cushion frame further comprising a pair of side frames and a front cross member located on a front side of the vehicle seat. The front cross member extends between the side frames and at least one means for supporting connected to the front cross member and arranged vehicle forward of the front cross member, the at least one means for supporting having a lower strength than the front cross member and being configured to support legs of an occupant in the event of a rear-end vehicular crash.

In another aspect, the present disclosure relates to a method to support the legs of an occupant in a vehicular rear-end crash, the method comprising: providing a seat cushion frame having a front cross member; connecting at least one leg support member to the seat cushion frame forward of the front cross member; and constructing the at least one leg support member such that at least a portion of the at least one leg support member comprises a strength lower than a strength of the front cross member.

BRIEF DESCRIPTION OF DRAWINGS

Features of the present disclosure will become more apparent from the following description in conjunction with the accompanying drawings.

DETAILED DESCRIPTION

The following describes embodiments of a seat cushion structure of a vehicle seat according to the present disclosure with reference to the drawings.

Figure 1:
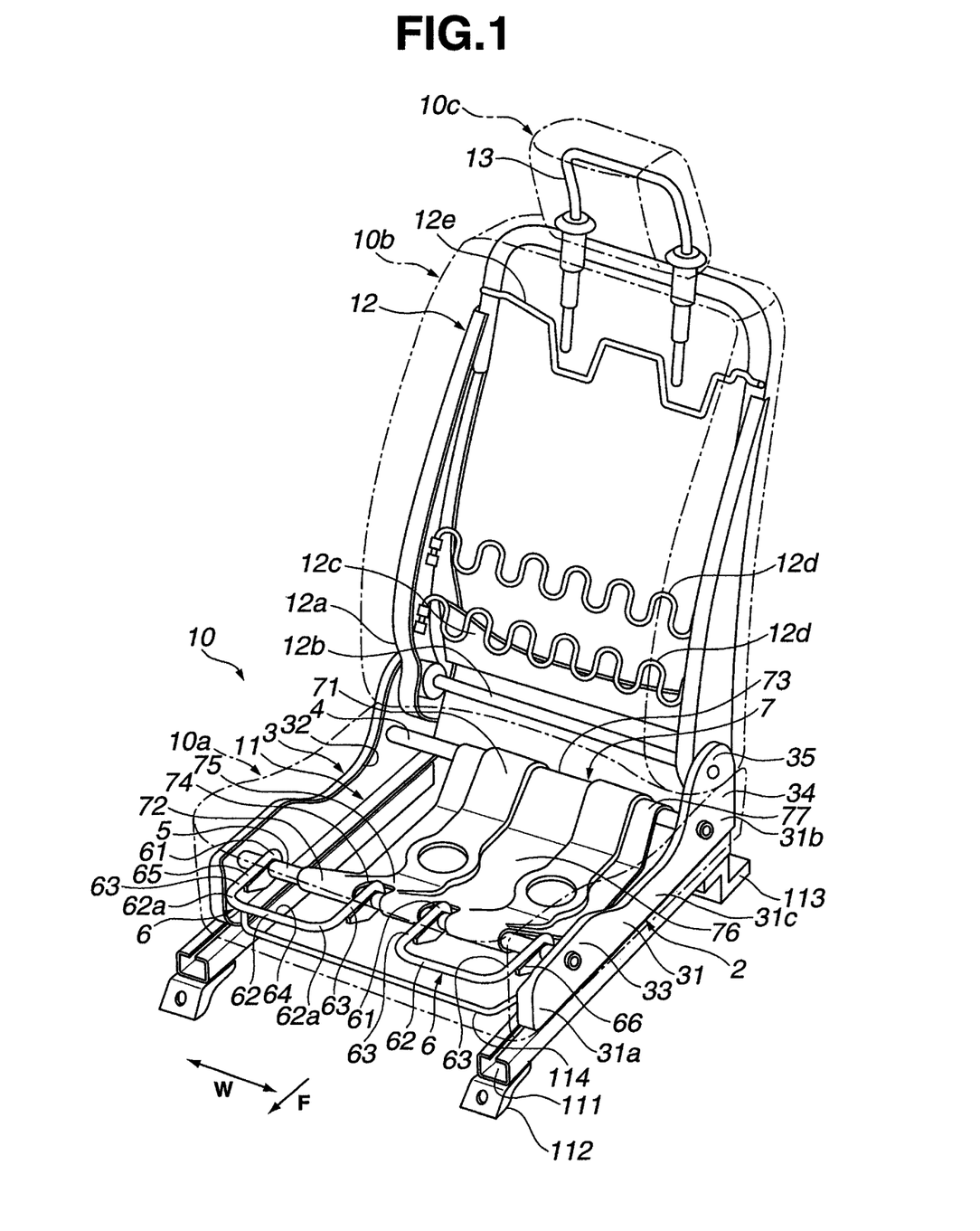
FIG. 1 is a perspective view showing a framework structure of a vehicle seat according to a first exemplary embodiment.

<Embodiment 1> The following describes a construction according to a first exemplary embodiment. In FIG. 1, an arrow F indicates a forward direction of vehicle seat 10 (or seat cushion 10a), whereas an arrow W indicates a lateral direction or cross direction of vehicle seat 10 (or seat cushion 10a).

As shown in FIG. 1, vehicle seat 10 according to the first exemplary embodiment may include seat cushion 10a on which an occupant may sit, and which is indicated by phantom lines. A seat back 10b may be provided to extend vertically upward from a rear portion of seat cushion 10a. A headrest 10c may be provided to extend vertically upward from an upper portion of seat back 10b. Seat cushion 10a, seat back 10b, and headrest 10c may have a seat cushion frame 11, a seat back frame 12, and a headrest frame 13, respectively, which may be framework members made of metal.

Seat cushion frame 11 may be composed of a left side frame 2 and a right side frame 3, which may be arranged at left and right side portions of seat cushion 10a, respectively, a front cross member 5, which may extend between front portions of side frames 2 and 3, and a rear cross member 4, which may extend between rear portions of side frames 2 and 3. Seat cushion frame 11 may thus be formed in a substantially rectangular framework in a plan view.

Each of left and right side frames 2 and 3 may be arranged to extend along a vehicle longitudinal direction F, arranged spaced apart from the other in a vehicle lateral direction W, and opposed to the other. Each of left and right side frames 2 and 3 may be formed by pressing a metal plate material, and formed with a side frame body 31 and a side frame flange portion 32 at a periphery of side frame body 31 for enhancing the strength of the each of side frames 2 and 3.

In each side frame body 31, a front portion 31a and a rear portion 31b may project upward higher than a central portion 31c. An upper end portion of each front portion 31a may be formed with a front-cross-member-mounting projecting portion 33 to which front cross member 5 may be mounted. A middle portion of each rear portion 31b may be formed with a rear-cross-member-mounting portion 34 to which rear cross member 4 may be mounted. An upper end portion of each rear portion 31b may be formed with a seat-back-frame-mounting extending portion 35 to which a lower end portion 12a of seat back frame 12 may be mounted.

Front cross member 5 may extend between front-cross-member-mounting projecting portions 33 of side frame bodies 31, and may be fixed, by welding or other fixing means, to front-cross-member-mounting projecting portions 33 under a condition that each end of front cross member 5 may pass through front-cross-member-mounting projecting portions 33. Front cross member 5 may be arranged in a high position in each side frame body 31 because each front-cross-member-mounting projecting portion 33, to which front cross member 5 may be fixed, may be formed at the upper end portion of front portion 31a of side frame body 31, which may further be formed to project upward higher than central portion 31c of side frame body 31.

Rear cross member 4 may extend between rear-cross-member-mounting surfaces 34 of side frame bodies 31, and may be fixed, by welding or other fixing means, to rear-cross-member-mounting surfaces 34 under a condition that each end of rear cross member 4 may pass through rear-cross-member-mounting surfaces 34. Each of front cross member 5 and rear cross member 4 may be formed of a hollow cylindrical rod (pipe) made of metal or other rigid material.

Figure 2:
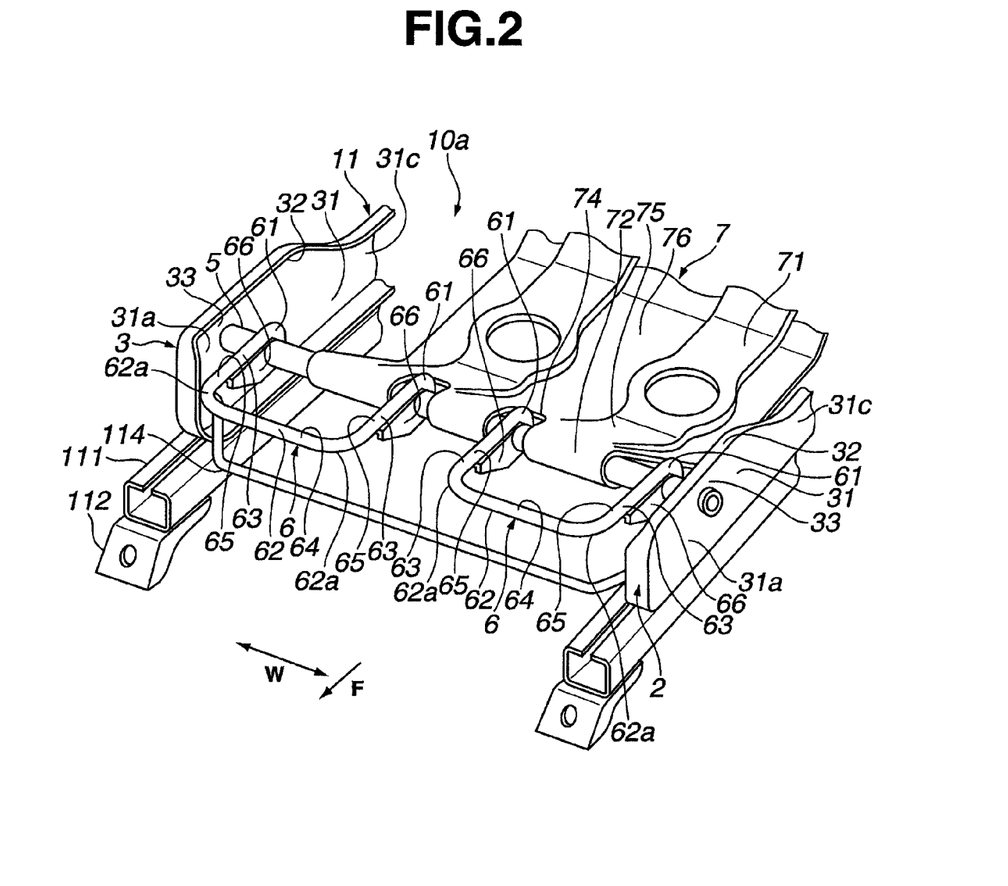
FIG. 2 is an enlarged perspective view showing a majority of the framework structure of the vehicle seat according to the first exemplary embodiment.

Pursuant to a first exemplary embodiment, as shown in FIG. 2, a pair of leg support members 6 may be arranged forward of front cross member 5, particularly, forward (in the direction of arrow F) of seat cushion 10a, and arranged in the lateral direction W of seat cushion 10a. The pair of leg support members 6 may correspond to the legs of an occupant seated in seat 10. Each leg support member 6 may be formed of a hollow cylindrical rod (pipe) made of metal which has a lower strength than front cross member 5. Leg support members 6 may, alternatively, be formed by bending a cylindrical rod, or by pressing a metal plate into a shape having a closed box section, a hat section, or a rectangular shape. Additionally, leg support members 6 may, alternatively, be formed from plastic or other suitable material that may easily deform when a load is applied from the calves (or other portions of the leg) of an occupant seated in seat 10 during a vehicle collision.

Base end portions 61 of leg support members 6 may be fixed, by welding or other fixing means, to an upper surface of front cross member 5. Other fixing means may include bolts or an engagement construction. Alternatively, base end portions 61 may be fixed to side frames 2 and 3.

Each leg support member 6 may be formed substantially in a U-shape in a plan view, with a lateral portion 62, which may extend in the lateral direction W of seat cushion 10a, and connecting portions 63, which may extend toward front cross member 5 from side portions 62a of front edge portion 62, at which leg support members 6 may be plastically bent. A vehicle rear end of each connecting portion 63 may be base end portion 61 of leg support members 6. Because leg support members 6 may be fixed to front cross member 5, each leg support member 6 may be arranged in a high position in side frame body 31, so that support members 6 may support the legs of an occupant seated in seat 10.

Alternatively, leg support members 6 may be formed substantially in an L-Shape, in a plan view, with lateral portions 62 and connecting portions 63, where ends of leg support members 6 may be fixed to front cross member 5 and side frames 2 and 3. Additionally, although lateral portion 62 and connecting portions 63 of leg support members 6 may be integrally formed, they may alternatively be separately formed.

Furthermore, as described above and in further detail below, leg support members 6 may be constructed so that lateral portion 62 may be plastically bent and deform rearward. However, leg support members 6 may alternatively be constructed so that connecting portions 63 deform into a buckled state when receiving a collision load.

Leg support members 6 may have a lower strength than front cross member 5, as described above, and receive the calves of an occupant seated in seat 10 when the occupant moves rearward with respect to seat 10 during a vehicle rear-end collision. The strength may be set to allow plastic deformation according to such a collision load, and also to bear a load from the legs of the occupant. The second and third exemplary embodiments, described below, are similar as to this construction, and accordingly, description of common elements thereof is omitted in the second and third exemplary embodiments.

Figure 4:
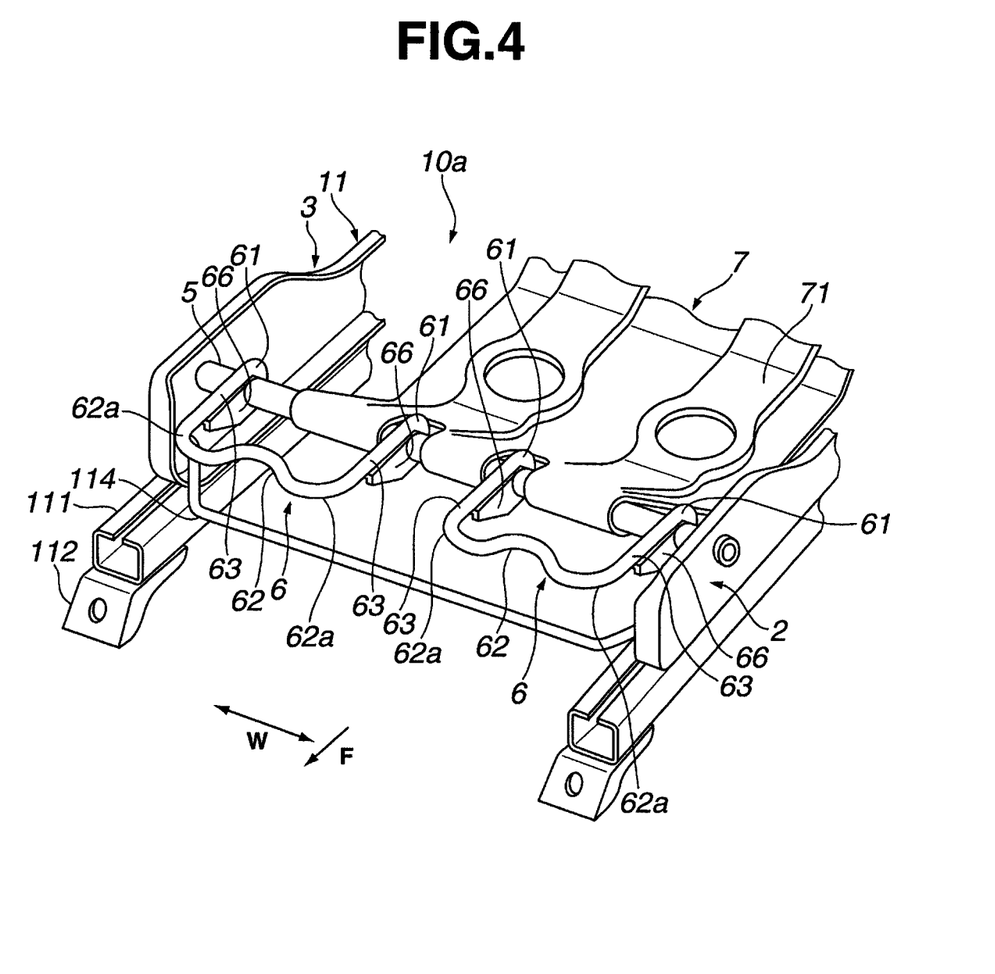
FIG. 4 is an enlarged perspective view of the majority of the framework structure of the vehicle seat showing a leg support member according to the first exemplary embodiment in a plastically deformed state.

When connecting portions 63 undergo a collision load, as described above, the collision load may act in the longitudinal direction along which connecting portions 63 may extend, so that the collision load acts in a direction to compress and buckle the connecting portions 63 on front cross member 5. On the other hand, the collision load may be applied to lateral portions 62 in a direction perpendicular to the lateral direction along which lateral portions 62 may extend, so that the collision load acts in a direction to bend lateral portions 62 rearward. Because lateral portions 62 may thus be more deformable than connecting portions 63, the collision load may cause plastic deformation of lateral portions 62 so that the collision load may be absorbed. In this way, lateral portions 62 may serve as a surface for receiving the collision load and, also, as a plastic deformation surface for absorbing the collision load by rearward bending and plastic deformation under the collision load (See, FIG. 4). The second and third exemplary embodiments, described below, are similar, also, as to this construction, and accordingly, description thereof is omitted in the second and third exemplary embodiments.

Figure 3:
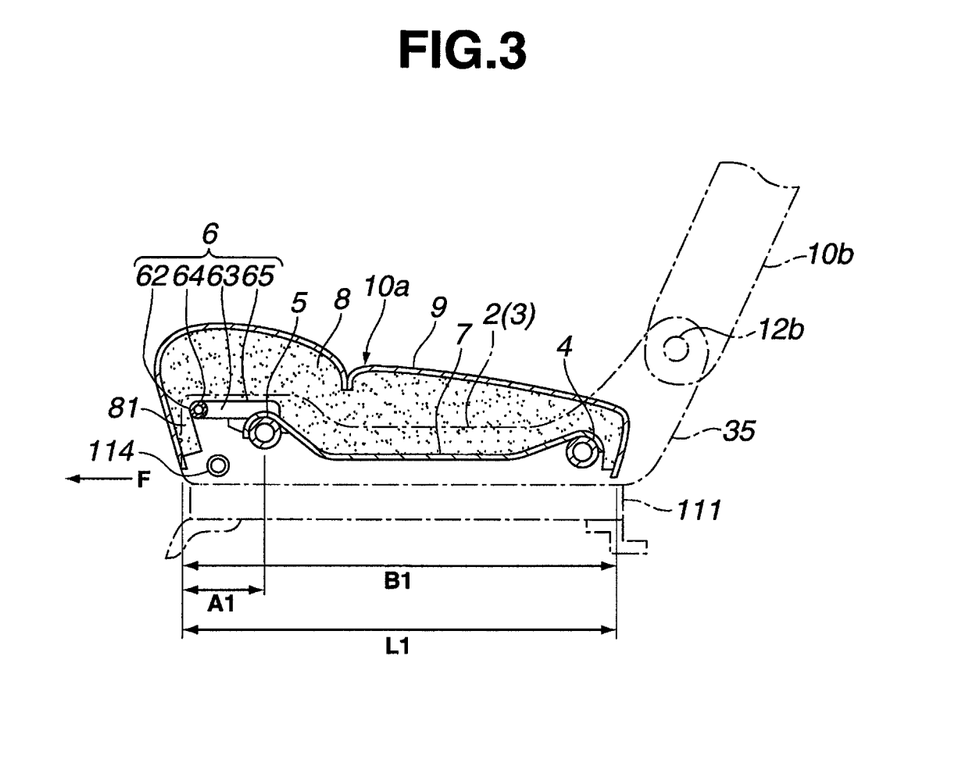
FIG. 3 is a side sectional view of a seat cushion according to the first exemplary embodiment.

As shown in FIG. 3, a seat cushion pad 8, described below, may be mounted on upper edge portions 64 and 65 of lateral portions 62 and connecting portions 63 of leg support members 6, so that upper edge portions 64 and 65 serve as a support surface for seat cushion pad 8, support the legs of an occupant seated in seat 10, and bear a load from the occupant's legs.

As shown in FIG. 3, a longitudinal length L1 of seat cushion 10a may be set similar to those of conventional seat cushions. A longitudinal length B1 of side frames 2 and 3 may be set substantially equal to the longitudinal length L1 of seat cushion 10a, similar to conventional seat cushions. Front cross member 5 may be arranged in a position rearward by about a distance of A1 from a front end portion of seat cushion 10a, where A1 represents a longitudinal length of leg support members 6.

Longitudinal length A1 of leg support members 6 may be set so that a collision load may be absorbed by plastic deformation of leg support members 6 in response to the collision load, and the legs of an occupant may be supported. Accordingly, leg support members 6 may be mounted within the longitudinal length L1 of seat cushion 10a, so that the longitudinal length L1 of seat cushion 10a may be set unchanged from a conventional seat cushion longitudinal length even when seat cushion 10*a* may be provided with leg support members 6.

As shown in FIGS. 1 and 2, reinforcing brackets 66, formed in a substantially triangular shape as viewed from the side, may be arranged between front cross member 5 and a lower surface of each connecting portion 63 of each leg support member 6. Each reinforcing bracket 66 may be fixed, by welding or other fixing means, to connecting portions 63 of leg support members 6 and to front cross member 5, for reinforcing a coupling portion between leg support members 6 and front cross member 5, and securely supporting the legs of an occupant seated in seat 10.

A seat cushion pan 7 may be provided inside of left side frame 2, right side frame 3, front cross member 5, and rear cross member 4 of seat cushion frame 11. Seat cushion pan 7 may be formed by pressing a metal plate. Seat cushion pan 7 may be formed with a plurality of beads 71 which may project upward for reinforcement. Seat cushion pan 7 may extend between front cross member 5 and rear cross member 4. A front end portion 72 and a rear end portion 73 of seat cushion pan 7 may be fixed, by welding or other fixing means, to front cross member 5 and rear cross member 4, respectively.

Front end portion 72 of seat cushion pan 7 may be formed with recesses 74 for slots. Each base end portion 61 of each leg support member 6, which may be fixed, by welding or other fixing means, to front cross member 5, may be exposed through recesses 74. Because front end portion 72 of seat cushion pan 7 may be fixed to front cross member 5, front end portion 72 may be arranged in a higher position than a central portion 76 in side frame bodies 31. A front inclined surface 75 may be formed to decline in a diagonally rearward direction from front end portion 72 to the central portion 76 of seat cushion pan 7 which may serve as a lower surface of seat cushion 10*a*.

Front inclined surface 75 of seat cushion pan 7, front cross member 5, and leg support members 6 may serve to suppress sinking of the hips of an occupant seated in seat 10 into seat cushion 10*a* and suppress a so-called submarine phenomenon which may occur during a vehicle head-on collision. Moreover, because rear end portion 73 of seat cushion pan 7 may be fixed to rear cross member 4, which may be arranged at middle portions of rear portions 31*b* of side frame bodies 31, rear end portion 73 may be arranged in a higher position than central portion 76 of seat cushion pan 7. A rear inclined surface 77 may be formed to decline in a diagonally forward direction from rear end portion 73 to central portion 76 of seat cushion pan 7.

Alternatively, seat cushion pad 8 may be supported by a plurality of wires which may be inserted in seat cushion pad 8.

As shown in FIG. 3, seat cushion pad 8 may be mounted on an upper portion of seat cushion pan 7. Seat cushion pad 8 may be formed of a foam material, such as polyurethane foam. Seat cushion pan 7 may be bonded to, or inserted and fixed to, seat cushion pad 8. This may serve to support the hips of an occupant seated in seat 10, and bear a load thereof. Moreover, as described above, seat cushion pad 8 may be mounted on upper edge portions 64 and 65 of lateral portions 62 and connecting portions 63 of leg support members 6, and fixed, by bonding or other fixing means, to leg support members 6. This may serve to support the legs of an occupant seated in seat 10, and bear a load thereof.

Because seat cushion pad 8 may be formed with a front side cushioning portion 81 which may extend in front of lateral portions 62 of leg support members 6, seat cushion pad 8 may serve as a cushioning member for lessening an impact when the calves of an occupant seated in seat 10 apply force to the leg support members 6. The thus-provided seat cushion pad 8 may cover an upper portion of seat cushion frame 11, which may be a framework member of seat cushion 10*a*.

Surfaces of seat cushion pad 8, except surfaces that face the seat cushion pan 7 and leg support members 6, and are fixed to seat cushion pan 7 and leg support members 6, namely, an upper surface, a front surface, left and right side surfaces, and a rear surface, of seat cushion pad 8, may be covered by a seat cushion skin 9, which may be formed of cloth, leather, synthetic materials, or combinations thereof. A periphery of seat cushion skin 9 may be attached to seat cushion frame 11 by attaching means (not shown). The attachment of seat cushion skin 9 to seat cushion frame 11 may serve to hold seat cushion pad 8 at seat cushion frame 11.

As shown in FIGS. 1 and 2, the vehicle seat 10 may be provided with a seat sliding mechanism. The seat sliding mechanism may include seat slide upper rails (not shown) and seat slide lower members 111 for sliding the vehicle seat 10 in the vehicle longitudinal direction, and a seat slide lock (not shown) for locking the vehicle seat 10 in place to prevent sliding. The seat slide upper rails may project downward from a lower surface of the lower portion of each of side frame flange portions 32 of left and right side frames 2 and 3. The seat slide upper rails may be provided with guide rollers (not shown). The seat slide upper rails may be arranged to move in the vehicle longitudinal direction in seat slide lower rails 111. Seat slide lower rails 111 may be provided with seat-mounting brackets 112 and 113 which may be fixed, by welding or other fixing means, to a front end and a rear end thereof, respectively. Seat slide lower rails 111 may be fixed to a vehicle body (not shown) by bolts and bolt nuts or other securing means. A lever 114, for releasing the seat slide lock, may be arranged rearward of lateral portions 62 of leg support members 6. This may allow lateral portions 62 of leg support members 6 to receive the calves of an occupant, preventing contact of the calves with lever 114 during a vehicle rear-end collision. Accordingly, it may be possible to prevent the seat slide lock from being accidentally released or causing additional discomfort to the occupant.

Seat back frame 12 may have a reversed U-shape, as viewed from a forward point. As described above, lower end portions 12*a* of seat back frame 12 may be rotatably mounted to seat-back-frame-mounting extending portions 35. Lower end portions 12*a* of seat back frame 12 and seat-back-frame-mounting extending portions 35 may be rotatably coupled through a support shaft 12*b* and a reclining device (not shown), so as to allow longitudinal reclining of seat back frame 12. Moreover, a lower member 12*c* may be fixed, by welding or other fixing means, at its left and right ends to a lower portion of seat back frame 12. S-shaped springs 12*d* and wire 12*e* may be attached to a middle portion of seat back frame 12. Headrest frame 13 may be selectively attached to an upper portion of seat back frame 12.

The following describes operations and advantages of the first exemplary embodiment. In the seat cushion structure of the vehicle seat according to the first exemplary embodiment, seat cushion frame 11 may be composed of left side frame 2 and right side frame 3, front cross member 5, and rear cross member 4. Leg support members 6 may be provided forward of front cross member 5, where leg support members 6 may have a lower strength than front cross member 5.

Accordingly, when an occupant seated in seat 10 may move rearward with respect to seat 10 during a vehicle rear-end collision, the calves of the occupant may be received by leg support members 6, because leg support members 6 may be arranged forward of front cross member 5. Therefore, when the occupant seated in seat 10 may move rearward, the calves of the occupant do not contact the front cross member 5, which has a higher strength than leg support members 6. Moreover, when the occupant seated in seat 10 may move rearward, when leg support members 6, which may have a lower strength than front cross member 5, receive the calves of the occupant, they may deform plastically so as to absorb and lessen a load applied to the calves of the occupant and suppress occupant discomfort. Specifically, lateral portions 62 of leg support members 6 may receive the calves of an occupant, plastically deform, absorb a collision load from the calves of the occupant, and lessen the collision load applied to the calves of the occupant during a vehicle rear-end collision.

The pair of leg support members 6 may be arranged forward of front cross member 5, specifically, forward (in the direction of arrow F) of seat cushion 10a, and arranged in the lateral direction W of seat cushion 10a, which correspond to left and right legs of an occupant seated in seat 10. Accordingly, the pair of leg support members 6 may support left and right legs of an occupant seated in seat 10, even when leg support members 6 may have a low strength, and receive collision loads from left and right calves of the occupant during a vehicle rear-end collision.

Each leg support member 6 may be formed of a hollow cylindrical rod (pipe) made of metal, or other material, which may have a lower strength than front cross member 5. Each base end portion 61 of leg support members 6 may be fixed, by welding or other fixing means, to front cross member 5. Because leg support member 6 may be formed of a hollow pipe, an upper surface of the hollow pipe may serve as a surface for supporting the legs of an occupant seated in seat 10. Moreover, a front surface of the hollow pipe may serve as a surface to receive a collision load that may be applied to the calves of the occupant during a vehicle rear-end collision, and may absorb the collision load by plastic deformation. Accordingly, leg support members 6 may be implemented by a simple structure with a minimum number of constituent parts.

Moreover, because base end portions 61 of leg support members 6 may be fixed to front cross member 5, a load to support the legs of an occupant seated in seat 10 and a load when the calves of the occupant may be received during a vehicle rear-end collision may be transmitted from leg support members 6 to front cross member 5. The input load may be received by front cross member 5 which may have a higher strength. Accordingly, the legs of the occupant seated in seat 10 may be securely supported although leg support members 6 may be provided with a lower strength than front cross member 5. The load, when the calves of the occupant are received during a vehicle rear-end collision, may act on leg support members 6 which may have a lower strength than front cross member 5 so as to allow plastic deformation of leg support members 6.

Reinforcing bracket 66, in the form of a substantially triangular shape as viewed from the side, may be arranged between front cross member 5 and the lower surface of each connecting portion 63 of each leg support member 6. Each reinforcing bracket 66 may be fixed, by welding or other fixing means, to connecting portions 63 of leg support members 6 and to front cross member 5 for reinforcing the coupling portion between leg support members 6 and front cross member 5, and securely supporting the legs of an occupant seated in seat 10. This may be effective for reinforcing the connecting portions 63 of leg support members 6, and the coupling portion between connecting portions 63 and front cross member 5, so that the strength of leg support members 6 may be lower, and a collision load applied to the calves of the occupant may be easily absorbed during a vehicle head-on collision, while a strength may be ensured to support the leg of the occupant seated in seat 10.

The following describes additional exemplary embodiments of the present disclosure. In describing these exemplary embodiments, the same characteristics are given to constituent parts similar to the first exemplary embodiment described above, and description thereof is omitted, and only differences are described.

Figure 5:
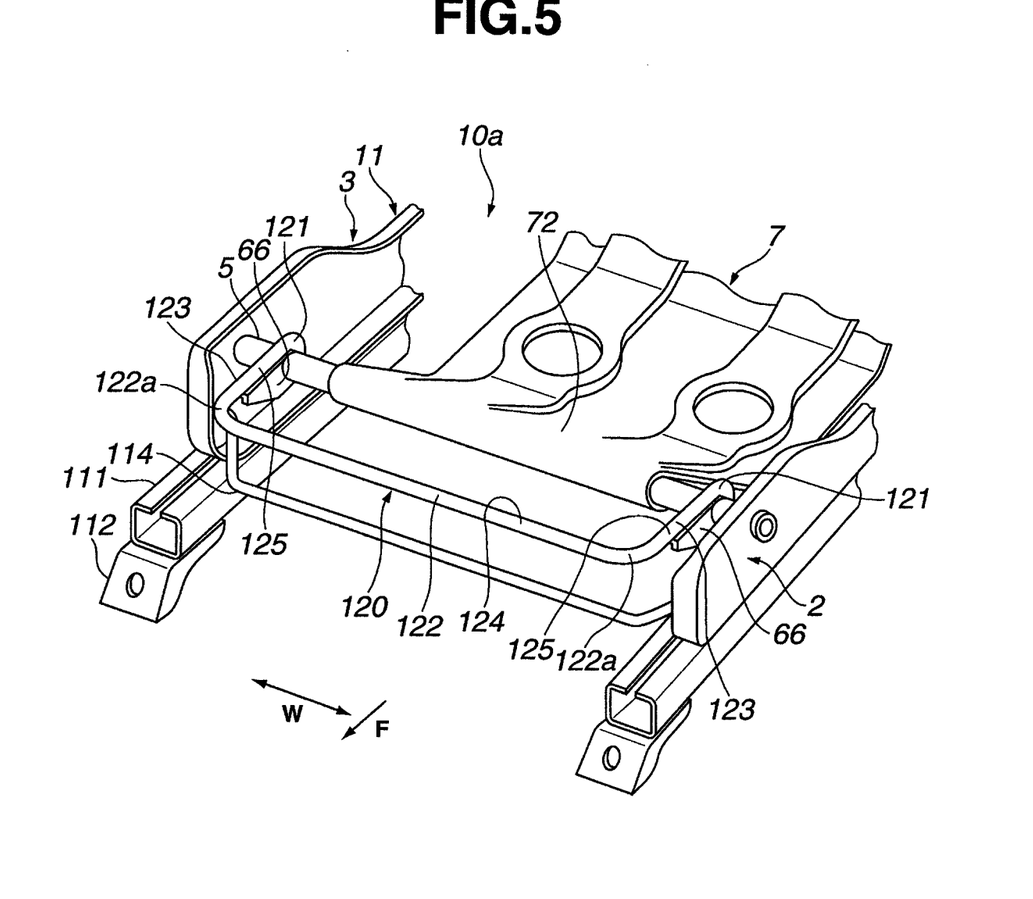
FIG. 5 is an enlarged perspective view showing a majority of a framework structure of a vehicle seat according to a second exemplary embodiment.

<Embodiment 2>The following describes a construction according to a second exemplary embodiment. As shown in FIG. 5, a leg support member 120 may be provided forward (in the direction of arrow F) of and projecting from front cross member 5. Leg support member 120 may extend substantially across the entire width of seat cushion 10a in the lateral direction W. Namely, a single leg support member 120 may be provided for both legs of an occupant seated in the seat 10.

Leg support member 120 may be formed substantially in a U-shape in a plan view, with a lateral portion 122, which may extend in the lateral direction W of seat cushion 10a, and connecting portions 123, which may extend toward front cross member from side portions 122a of lateral portion 122 at which leg support member 120 may be plastically bent. Leg support member 120 may be formed by bending a hollow cylindrical rod (pipe) made of metal, or other material, which may have a lower strength than front cross member 5. Base end portions 121 of leg support member 120 may be fixed, by welding or other fixing means, to front cross member 5.

Alternatively, leg support member 120 may be connected to front cross member 5 by a single connecting portion (not shown), located at the lateral center of front cross member 5, forming a substantially T-shape in a plan view.

A seat cushion pad may be mounted on upper edge portions 124 and 125 of lateral portion 122 and connecting portions 123 of leg support member 120, so that upper edge portions 124 and 125 support the legs of an occupant seated in the seat 10, and bear a load from the legs. Front end portion 72 of seat cushion pan 7 may be positioned between base end portions 121 of leg support member 120, and may be fixed, by welding or other fixing means, to front cross member 5.

In this way, leg support member 120, according to the second exemplary embodiment, may be formed by bending a hollow cylindrical rod extending substantially across the entire width of seat cushion 10a in the lateral direction W. Namely, left and right legs of an occupant seated in the seat may be supported by the single leg support member 120. As in the first exemplary embodiment described above, leg support member 120 may have a lower strength than front cross member 5 and may receive the calves of an occupant seated in seat 10 when the occupant moves rearward with respect to seat 10 during a vehicle rear-end collision. The strength may be set to allow plastic deformation according to such a collision load and also to bear a load from the legs of the occupant.

The following describes operations and advantages of the second exemplary embodiment. In the seat cushion structure of the vehicle seat according to the second exemplary embodiment, connecting portions 123 may be positioned close to left and right ends of seat cushion 10a, respectively, where large reaction forces may act on connecting portions 123 according to a collision load.

Accordingly, lateral portion 122 of leg support member 120, which may be provided to extend substantially across the entire width of seat cushion 10a in the lateral direction W, may receive a collision load from the calves of an occupant at any point in the entire width of seat cushion 10a in the lateral direction W, during a vehicle rear-end collision. Additionally, because connecting portions 123 of leg support member 120 may be positioned close to the left and right ends of seat cushion 10a, it may be possible to suppress an increase of the collision load input from leg support member 120 to the calves of the occupant. Further, leg support member 120 may be easily plastically deformable, which may enable the collision load to be easily absorbed, and the collision load applied to the calves of the occupant may be reduced.

Figure 6:
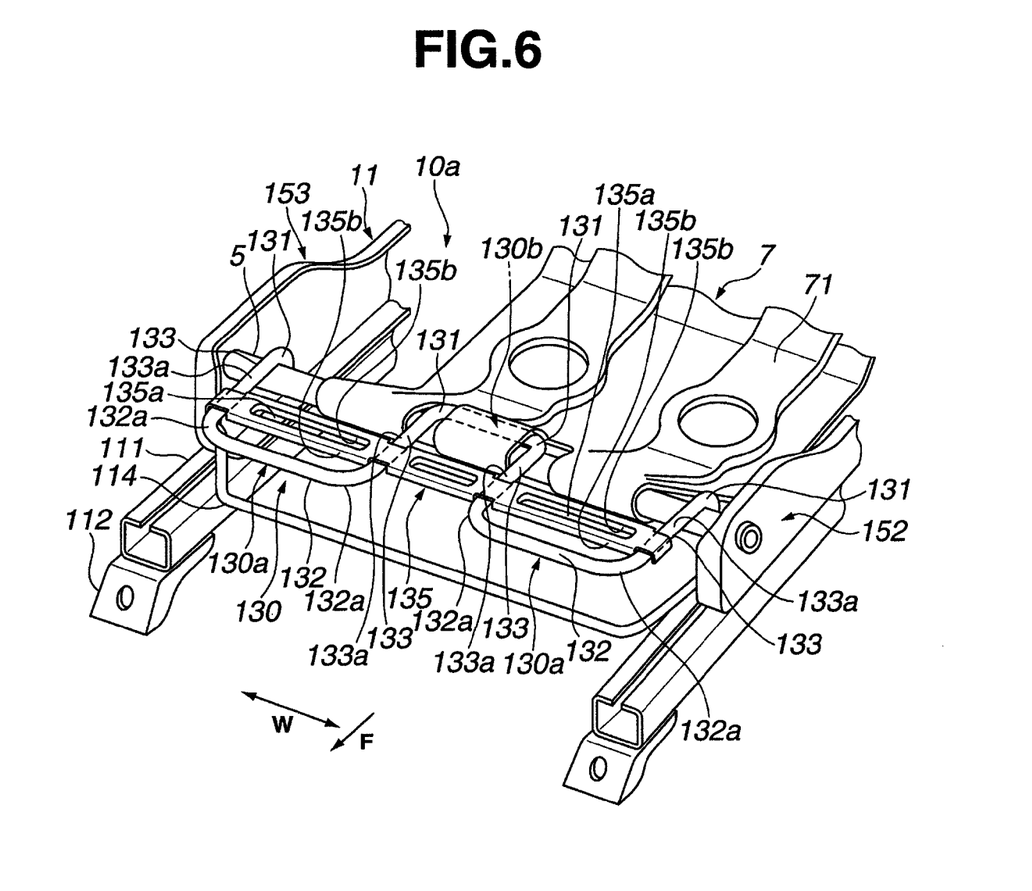
FIG. 6 is an enlarged perspective view showing a majority of a framework structure of a vehicle seat according to a third exemplary embodiment.

<Embodiment 3> The following describes a construction according to a third exemplary embodiment. As shown in FIG. 6, a leg support member 130 may be provided forward (in the direction of arrow F) of and projecting from front cross member 5 and extending in the lateral direction W of seat cushion 10a. Leg support member 130 may be composed of leg support portions 130a provided for the legs of an occupant seated in the seat, and a left-right-coupling portion 130b that may couple the leg support portions 130a.

Each leg support portion 130a, which may constitute leg support member 130, may be formed substantially in a U-shape in a plan view, with a lateral portion 132 extending in the lateral direction W of seat cushion 10a and connecting portions 133 extending toward front cross member 5 from side portions 132a at which leg support member 130 may be plastically bent. Leg support portions 130a and left-right-coupling portion 130b may be integrally formed by bending a hollow cylindrical rod (pipe) made of metal, or other material, which may have a lower strength than front cross member 5. Base end portions 131 of leg support member 130 may be fixed, by welding or other fixing means, to front cross member 5.

A seat cushion pad support plate 135 may be fixed, by welding or other fixing means, to upper edge portions 133a of connecting portions 133 of leg support portions 130a and extending over leg support portions 130a. Seat cushion pad support plate 135 may be formed with slot 135a and flange 135b, where slot 135a may serve for weight reduction and easy deformation under a collision load applied from forward direction F, and flange 135b may serve for reinforcement against a load from above. A seat cushion pad may be mounted on seat cushion pad support plate 135, so that seat cushion pad support plate 135 may support the legs of an occupant seated in the seat, and may bear a load from the legs.

Leg support member 130, according to the third exemplary embodiment, may be composed of leg support portions 130a and left-right-coupling portion 130b, which may be integrally formed by bending a hollow cylindrical rod, where leg support portions 130a support left and right legs of an occupant seated in the seat. Alternatively, leg support member 130 may be formed from separate components.

Figure 7:
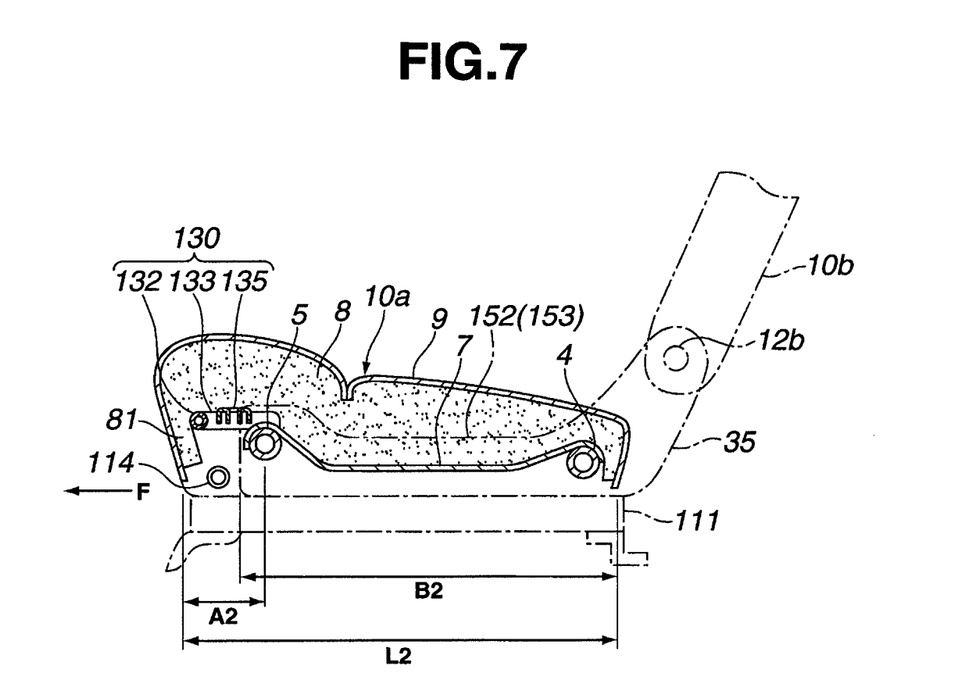
FIG. 7 is a side sectional view of a seat cushion according to the third exemplary embodiment.

As shown in FIG. 7, seat cushion 10a may have a longitudinal length L2 that may be set similar to a conventional seat cushion length. The length of side frames 152 and 153 may be set to a length B2 that may be shorter than the longitudinal length L2 of seat cushion 10a by about a longitudinal length A2 of leg support member 130 (by the length of connecting portion 133). Front cross member 5 may be arranged in a position rearward by about a longitudinal length A2 from a front end portion of seat cushion 10a, where A2 represents a longitudinal length of leg support member 130 (length of side edge portion 133). Accordingly, as in the first exemplary embodiment, leg support member 130 may be mounted within the longitudinal length L2 of seat cushion 10a, so that the longitudinal length L2 of seat cushion 10a may be set unchanged from a conventional seat cushion longitudinal length even when seat cushion 10a may be provided with leg support member 130.

The following describes operations and advantages of the third exemplary embodiment. In the seat cushion structure of the vehicle seat according to the third exemplary embodiment, leg support member 130 may be composed of leg support portions 130a provided for the legs of an occupant. Further, left-right-coupling portion 130b may couple leg support portions 130a, where each leg support portion 130a may be formed substantially in a U-shape in a plan view, with a lateral portion 132, and connecting portions 133. Leg support portions 130a and left-right-coupling portion 130b may be integrally formed by bending a hollow cylindrical rod. Accordingly, leg support portions 130a, which constitute leg support member 130, may support the legs of an occupant seated in the seat, even when leg support portions 130a may have a low strength.

Moreover, it may be sufficient for each leg support portion 130a to receive a collision load from one of the calves of the occupant seated in the seat during a vehicle rear-end collision. Because the collision load received by each leg support portion 130a may thus be reduced, the strength of leg support portions 130a may be reduced. Accordingly, it may be possible to suppress an increase of the collision load applied from leg support portions 130a to the calves of the occupant, and set leg support portions 130a to be easily plastically deformable, so that the collision load may be easily absorbed, and the collision load applied to the calves of the occupant may be reduced.

The construction that leg support member 130 may be formed from support portions 130a and left-right-coupling portion 130b and integrally formed by bending a hollow cylindrical rod may be effective for reducing the number of constituent parts and enhancing the ease of assembly. Further, left-right-coupling portion 130b may be fixed to front cross member 5. Seat cushion pad support plate 135 may be provided on upper edge portions 133a of connecting portions 133 of leg support portions 130a and extending over leg support portions 130a. This may be effective for securely supporting the legs of an occupant seated in the seat, and thereby making the occupant comfortable.

Advantageously, embodiments disclosed herein provide a vehicle seat capable of reducing a load that is applied to the calves (or other leg portions) of an occupant seated in the vehicle seat, and thereby suppressing occupant discomfort, during a vehicle rear-end collision.

As such, a vehicle seat may include at least one leg support member which may be arranged forward of a front cross member of a seat cushion frame, wherein the at least one leg support member may have a lower strength than the front cross member and may be easily deformable when a load is applied during a vehicle collision.

Additionally the at least one leg support member may receive the calves (or other leg portions) of an occupant seated in the seat, thereby preventing the calves from contacting a stronger front cross member, even when the occupant moves rearward with respect to the seat during a vehicle rear-end collision. Moreover, the at least one leg support member may reduce the load that may be applied to the calves of the occupant seated in the seat, suppressing occupant discomfort.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A vehicle seat comprising: a seat cushion frame comprising:
   a pair of side frames, each of the side frames being a single solid member; and a front cross member located on a front side of the vehicle seat, the front cross member extending between the side frames and directly contacting each of the side frames; and at least one leg support member connected to the front cross member, and arranged vehicle forward of the front cross member, wherein the at least one leg support member comprises at least a portion having a mechanical strength lower than a mechanical strength of the front cross member and set to allow plastic deformation upon a vehicle rear-end collision.

2. The vehicle seat according to claim 1, wherein the at least one leg support member comprises a formed hollow pipe.

3. The vehicle seat according to claim 1, wherein the at least one leg support member comprises a formed plastic.

4. The vehicle seat according to claim 1, wherein the front cross member is disposed rearward of a vehicle front end of the side frames.

5. The vehicle seat according to claim 1, wherein the at least one leg support member is extended from an upper surface of the front cross member.

6. The vehicle seat according to claim 1, wherein a seat cushion pan is extended between the front cross member and a rear cross member, wherein the rear cross member is on a rear side of a vehicle seat.

7. The vehicle seat according to claim 1, further comprising:

a seat slide mechanism to slide the vehicle seat;

a seat slide lock to prevent sliding of the vehicle seat; and a lever member to release the seat slide lock;

wherein the lever member is arranged rearward of the at least one leg support member.

8. The vehicle seat according to claim 1, wherein the at least one leg support member is configured to deform upon application of force by a calf of an occupant seated in the vehicle seat.

9. The vehicle seat according to claim 1, wherein the at least one leg support member comprises a pair of the leg support members.

10. The vehicle seat according to claim 9, wherein the pair of the leg support members are formed of a single bent rod-shaped member.

11. The vehicle seat according to claim 1, wherein the at least one leg support member comprises:

a lateral portion extending in a vehicle lateral direction; and at least one connecting portion extending from the lateral portion to the front cross member.

12. The vehicle seat according to claim 11, wherein a base end portion of the at least one connecting portion is fixed to the front cross member.

13. The vehicle seat according to claim 11, further comprising a reinforcing bracket connected to the at least one connecting portion of the at least one leg support member and to the front cross member.

14. The vehicle seat according to claim 11, further comprising a support plate extending between at least two connecting portions of the at least one leg support member.

15. The vehicle seat according to claim 11, wherein the lateral portion of the at least one leg support member is disposed rearward of a vehicle front end of the side frames.

16. The vehicle seat according to claim 11, wherein the at least one connecting portion comprises two connecting portions extending from a left side portion and a right side portion of the lateral portion to the front cross member.

17. The vehicle seat according to claim 16, wherein the at least one leg support member comprises a substantially U-shaped portion.

18. A vehicle seat comprising:

a seat cushion frame comprising:

a pair of side frames, each of the side frames being a single solid member; and a front cross member located on a front side of the vehicle seat, the front cross member extending between the side frames and directly contacting each of the side frames; and at least one means for supporting connected to the front cross member, and arranged vehicle forward of the front cross member, the at least one means for supporting having a lower mechanical strength than the front cross member and set to allow plastic deformation upon a vehicle rear-end collision, and being configured to support legs of an occupant in the event of a rear-end vehicular crash.

19. The vehicle seat according to claim 18, wherein the at least one means for supporting comprises:

a lateral portion extending in a vehicle lateral direction; and at least one means for connecting the lateral portion to the front cross member.

20. A method to support legs of an occupant in a vehicular rear-end crash, the method comprising:

providing a seat cushion frame having a front cross member and a pair of side frames, each of the side frames being a single solid member, the front cross member directly contacting each of the side frames;

connecting at least one leg support member to the front cross member of the seat cushion frame forward of the front cross member;

constructing the at least one leg support member such that at least a portion of the at least one leg support member comprises a mechanical strength lower than a mechanical strength of the front cross member and set to allow plastic deformation upon a vehicle rear-end collision.

21. The method of claim 20, further comprising constructing the at least one leg support member having at least one substantially U-shaped portion.

* * * * *